US009554333B2

United States Patent
Li et al.

(10) Patent No.: US 9,554,333 B2
(45) Date of Patent: Jan. 24, 2017

(54) METHOD FOR CONTROLLING TRANSMISSION POWER OF WIRELESS DEVICE

(71) Applicant: HTC Corporation, Taoyuan (TW)

(72) Inventors: Chien-Yen Li, Taoyuan (TW); Chih-Wen Ko, Taoyuan (TW); Fu-An Chu, Taoyuan (TW); Shau-Hua Shu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 11 days.

(21) Appl. No.: 14/821,208

(22) Filed: Aug. 7, 2015

(65) Prior Publication Data

US 2015/0351048 A1 Dec. 3, 2015

Related U.S. Application Data

(62) Division of application No. 13/348,941, filed on Jan. 12, 2012, now Pat. No. 9,137,753.

(60) Provisional application No. 61/521,151, filed on Aug. 8, 2011.

(51) Int. Cl.
  *H04W 52/02* (2009.01)
  *H04L 1/20* (2006.01)
  *H04W 52/26* (2009.01)

(52) U.S. Cl.
  CPC .......... *H04W 52/0245* (2013.01); *H04L 1/203* (2013.01); *H04W 52/267* (2013.01); *Y02B 60/50* (2013.01)

(58) Field of Classification Search
  CPC . H04W 52/0245; H04W 52/267; Y02B 60/50; C07D 495/04; H04L 1/203
  See application file for complete search history.

(56) References Cited

U.S. PATENT DOCUMENTS

| | | | | |
|---|---|---|---|---|
| 7,984,179 B1 * | 7/2011 | Huang | ............... | H04N 21/2662 709/231 |
| 8,565,081 B1 * | 10/2013 | Yuan | ..................... | H04L 1/0002 370/230 |
| 8,614,964 B1 * | 12/2013 | Vargantwar | .......... | H04L 1/0002 370/252 |
| 2005/0128998 A1 | 6/2005 | Jelitto et al. | | |
| 2006/0018288 A1 * | 1/2006 | Luo | ...................... | H04B 7/0691 370/334 |

(Continued)

FOREIGN PATENT DOCUMENTS

CN 1625137 A 6/2005
CN 102065534 A 5/2011

OTHER PUBLICATIONS

Xu, Ya-Jing et al., "Research on TPC Algorithm in a Dense WLAN Environment.", Microelectronics & Computer vol. 24 No. 5 (2007): pp. 19-21 and 25.

*Primary Examiner* — Khaled Kassim
(74) *Attorney, Agent, or Firm* — Birch, Stewart, Kolasch & Birch, LLP

(57) ABSTRACT

A method for controlling transmission power of a wireless device is provided. A WiFi link is established to a communication device. A data rate of data packets transmitted to the communication device is monitored. Information from the communication device is obtained in response to the transmitted data packets. A transmission power of the wireless device is decreased when the data rate of the data packets reaches a highest data rate and the first information satisfies a specific condition.

2 Claims, 10 Drawing Sheets

(56) References Cited

U.S. PATENT DOCUMENTS

| | | |
|---|---|---|
| 2007/0184853 A1 | 8/2007 | Hottinen et al. |
| 2007/0248059 A1 | 10/2007 | Jain et al. |
| 2008/0056201 A1 | 3/2008 | Bennett |
| 2008/0089261 A1* | 4/2008 | Wentink .............. H04W 52/287 370/311 |
| 2008/0089350 A1* | 4/2008 | Liu ........................ H04B 1/006 370/401 |
| 2008/0119130 A1* | 5/2008 | Sinha .................... H04W 12/06 455/1 |
| 2008/0318518 A1* | 12/2008 | Coutinho ............... H04H 20/62 455/3.06 |
| 2009/0005102 A1* | 1/2009 | Das ..................... H04W 52/241 455/522 |
| 2009/0088080 A1* | 4/2009 | Zhang ............... H04W 72/0486 455/63.1 |
| 2009/0196372 A1* | 8/2009 | Zhang .................. H04B 7/0417 375/267 |
| 2009/0312005 A1* | 12/2009 | Mukundan ............ H04L 1/0002 455/422.1 |
| 2010/0260249 A1* | 10/2010 | Tu ........................ H04L 27/0008 375/227 |
| 2010/0303047 A1 | 12/2010 | Ibrahim et al. |
| 2011/0007790 A1* | 1/2011 | Xu ........................ H04L 1/0001 375/225 |
| 2011/0105025 A1* | 5/2011 | Wang .................... H04L 1/0019 455/41.2 |
| 2011/0151884 A1* | 6/2011 | Zhao ................. H04W 72/1205 455/452.1 |
| 2011/0267966 A1* | 11/2011 | Gao ..................... H04W 28/22 370/252 |
| 2013/0010704 A1* | 1/2013 | Kronquist ............. H04W 52/38 370/329 |
| 2013/0080650 A1* | 3/2013 | Cherian .................. H04L 69/22 709/230 |
| 2013/0128762 A1 | 5/2013 | Guo |
| 2014/0365671 A1 | 12/2014 | Petersen et al. |
| 2015/0098354 A1 | 4/2015 | Perez Grovas |

* cited by examiner

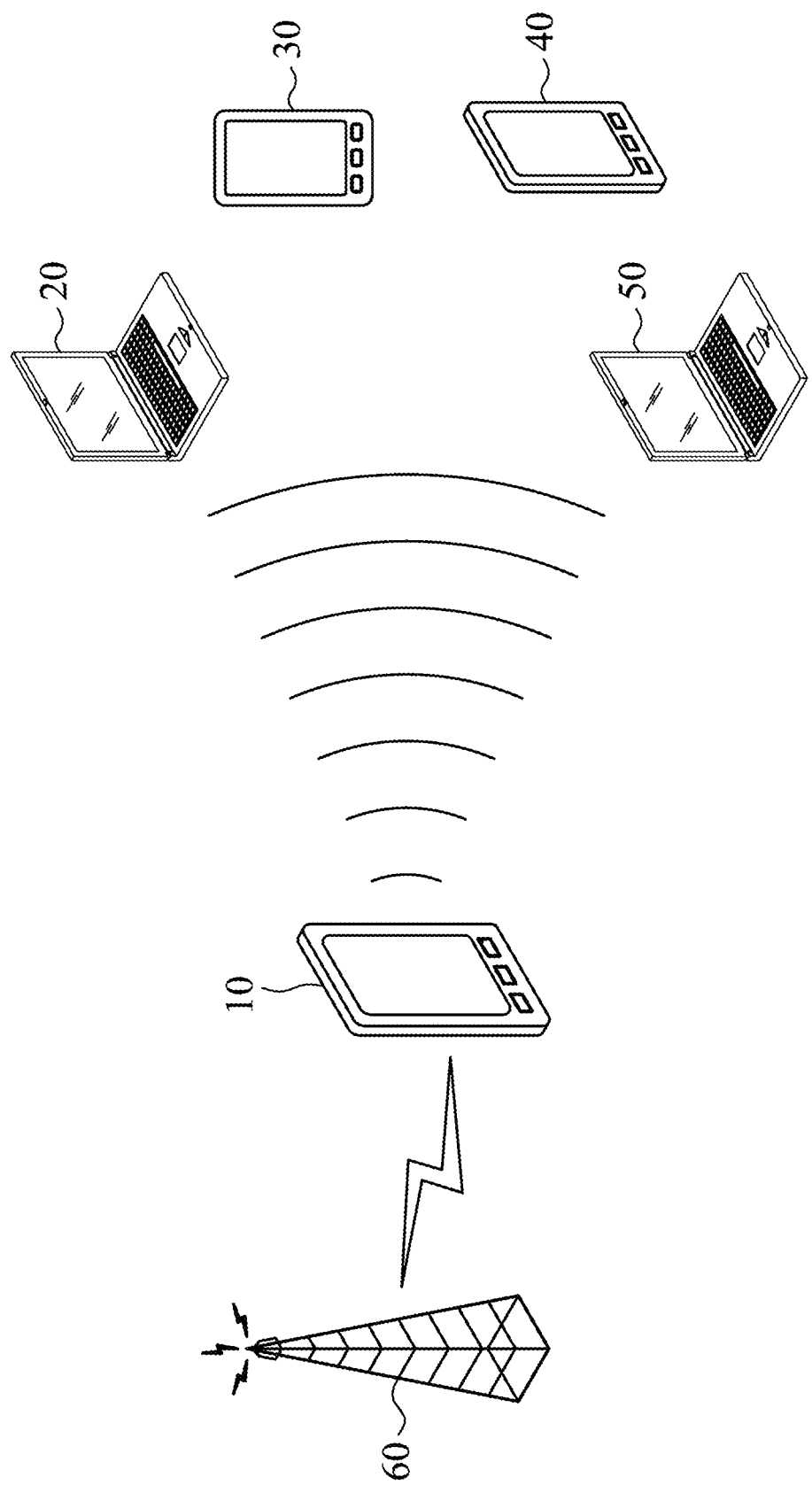

METHOD FOR CONTROLLING TRANSMISSION POWER OF WIRELESS DEVICE

CROSS REFERENCE TO RELATED APPLICATIONS

This Application is a Divisional of copending application Ser. No. 13/348,941, filed on Jan. 12, 2012, which claims priority under 35 U.S.C. §119(e) to U.S. Provisional Application No. 61/521,151, filed on Aug. 8, 2011, all of which are hereby expressly incorporated by reference into the present application.

BACKGROUND OF THE INVENTION

Field of the Invention

The invention relates to a wireless device, and more particularly to a method for controlling transmission power of a wireless device.

Description of the Related Art

In recent years, mobile phones have become more popular and have various powerful applications, such as "Hot Spot" wireless fidelity (WiFi) wireless Internet connection, which provides Internet access over a wireless local area network (WLAN) for users nearby a mobile phone. However, the mobile phone functioning as a Hot Spot will consume lots of power due to the mobile phone operating in a transmission mode.

Therefore, it is desired to save power for mobile devices in a transmission mode.

BRIEF SUMMARY OF THE INVENTION

Methods for controlling transmission power of a wireless device and a wireless device are provided. An embodiment of a method for controlling transmission power of a wireless device is provided. The method comprises: establishing a WiFi link to a communication device; monitoring a data rate of data packets transmitted to the communication device; obtaining first information from the communication device in response to the transmitted data packets; decreasing a transmission power of the wireless device when the data rate of the data packets reaches a highest data rate and the first information satisfies a specific condition.

Furthermore, an embodiment of a method for controlling transmission power of a wireless device is provided. The method comprises: establishing a WiFi link to a communication device; transmitting data packets to the communication device according to a first transmission power; adjusting a data rate of the data packets according to a packet error rate (PER); transmitting data packets to the communication device according to a second transmission power smaller than the first transmission power when the data rate of the data packets reaches a highest data rate and the PER satisfies a specific condition; and transmitting data packets to the communication device according to the first transmission power when the data rate of the data packets reaches the highest data rate and the PER does not satisfy the specific condition.

Moreover, a wireless device is provided. The wireless device comprises a processor, an antenna and a radio frequency (RF) module coupled between the antenna and the processor. The RF module comprises a power amplifier which transmits data packets from the processor to a communication device with a first transmission power. The processor establishes a WiFi link to the communication device via the RF module and the antenna, and obtains first information from the communication device in response to the transmitted data packets. The processor controls the power amplifier to transmit the data packets with a second transmission power smaller than the first transmission power when a data rate of the data packets reaches a highest data rate and the first information satisfies a specific condition.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 8 shows a schematic diagram illustrating a mobile network communication system according to an embodiment of the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
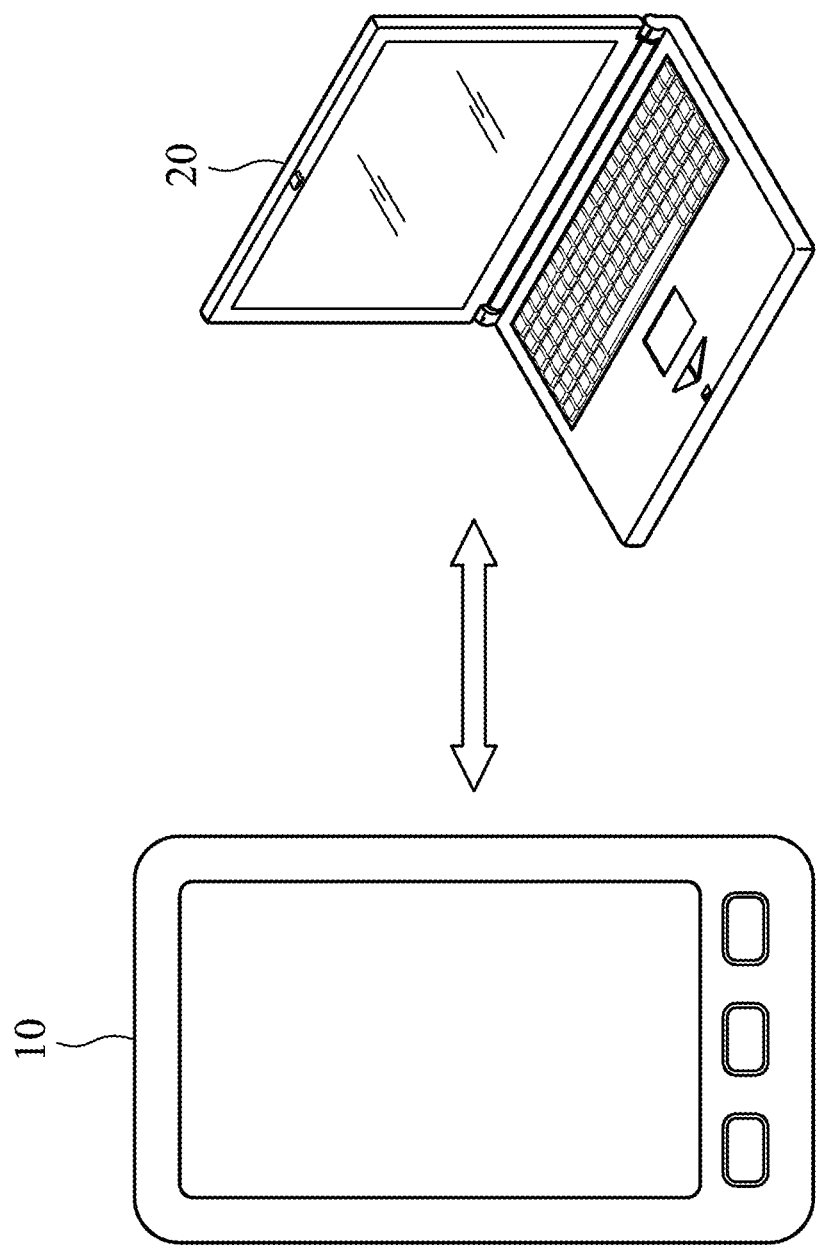
FIG. 1 shows a schematic diagram illustrating IEEE 802.11 wireless fidelity (WiFi) network communications between two electrical devices.

FIG. 1 shows a schematic diagram illustrating IEEE 802.11 wireless fidelity (WiFi) network communications between two electrical devices 10 and 20, wherein the electrical devices 10 and 20 may be computers, portable devices (such as mobile phone, tablet computer) and so on. In FIG. 1, the devices 10 and 20 are equipped with wireless local area network (WLAN) modules (e.g. 802.11b, 802.11g or 802.11n) to perform peer to peer communications. When one of the electrical devices 10 and 20 uses a highest data rate to transmit data packets to the other electrical device, e.g. 11 Mbps for the 802.11b specification, 54 Mbps for the 802.11g specification or MCS7 for the 802.11n specification, the one of the electrical devices 10 and 20 will perform a method to control transmission power of the WLAN module thereof according to an embodiment of the invention, so as to achieve lower power consumption.

Figure 2:
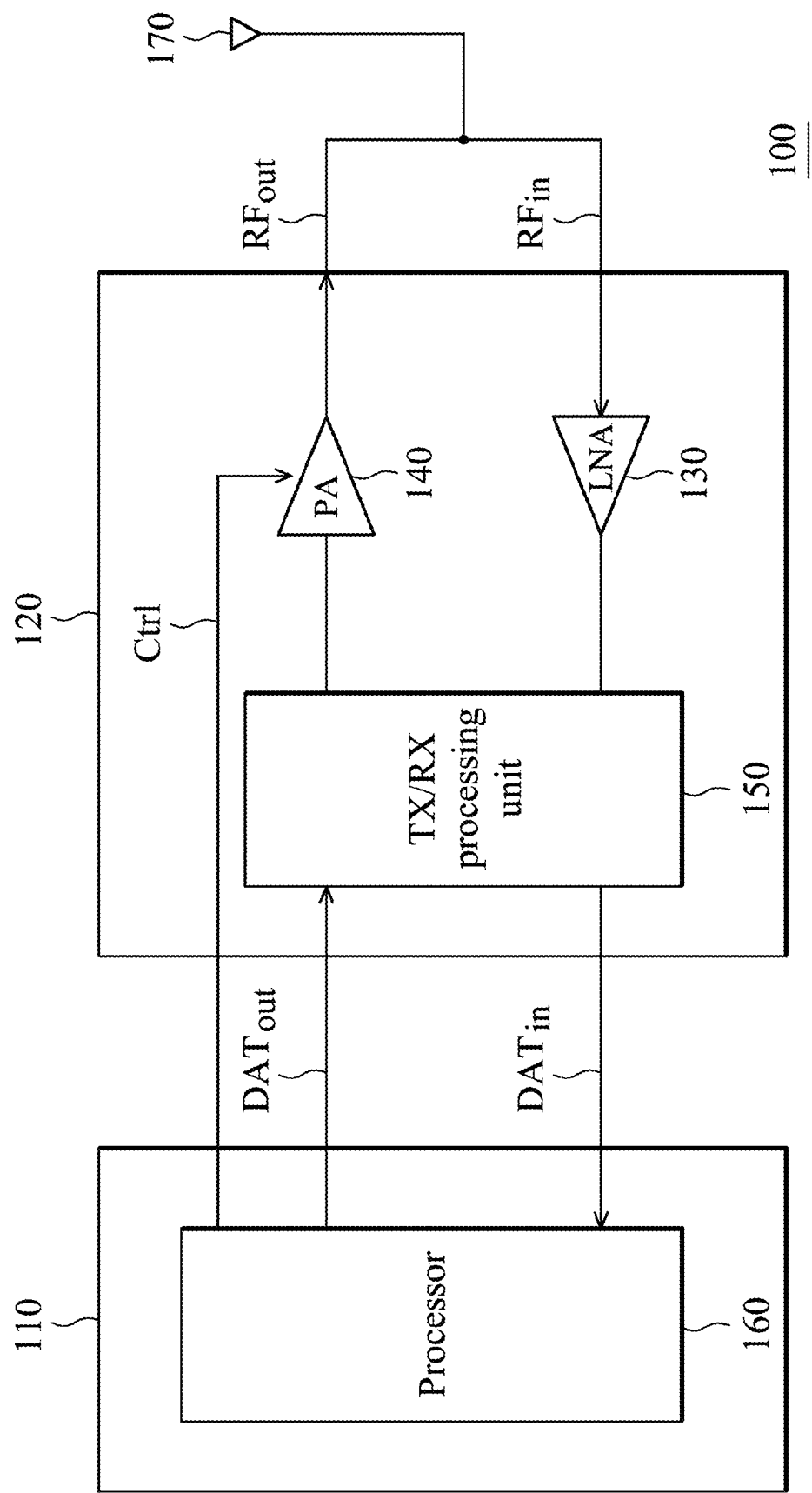
FIG. 2 shows a block diagram illustrating a WLAN module equipped in a wireless device according to an embodiment of the invention.

FIG. 2 shows a block diagram illustrating a WLAN module 100 equipped in a wireless device (e.g. 10 or 20 of FIG. 1) according to an embodiment of the invention. The WLAN module 100 comprises a Baseband chip 110 and a radio frequency (RF) module 120. The RF module 120 is coupled between the Baseband chip 110 and an antenna 170, which comprises a low noise amplifier (LNA) 130, a power amplifier (PA) 140 and a TX/RX processing unit 150. The TX/RX processing unit 150 receives and modulates the data $DAT_{out}$ from a processor 160 of the Baseband chip 110, so as to provide the RF signal $RF_{out}$ to the antenna 170 via the PA 140 for transmitting data packets to another wireless device. Simultaneously, the processor 160 of the Baseband chip 110 further provides a control signal Ctrl to the PA 140 for controlling transmission power of the wireless device. In general, the receiving wireless device will send back acknowledge (ACK) messages in response to the data packets transmitted by the transmitting wireless device. Therefore, the TX/RX processing unit 150 of the transmitting wireless device will receive and demodulate the RF signal $RF_{in}$ corresponding to the ACK message via the LNA 130 and the antenna 170, so as to provide the data $DAT_{in}$ to the processor 160 of the Baseband chip 110, and then the processor 160 of the Baseband chip 110 obtains a packet error rate (PER) according to the data $DAT_{in}$. The PER is the number of incorrectly received data packets divided by the total number of received packets, wherein a packet is declared incorrect if at least one bit is erroneous. Therefore, the smaller the PER, the better the communication quality. When the receiving wireless device and the transmitting wireless device approach each other, the processor 160 of the Baseband chip 110 will obtain a better PER.

Figure 3:
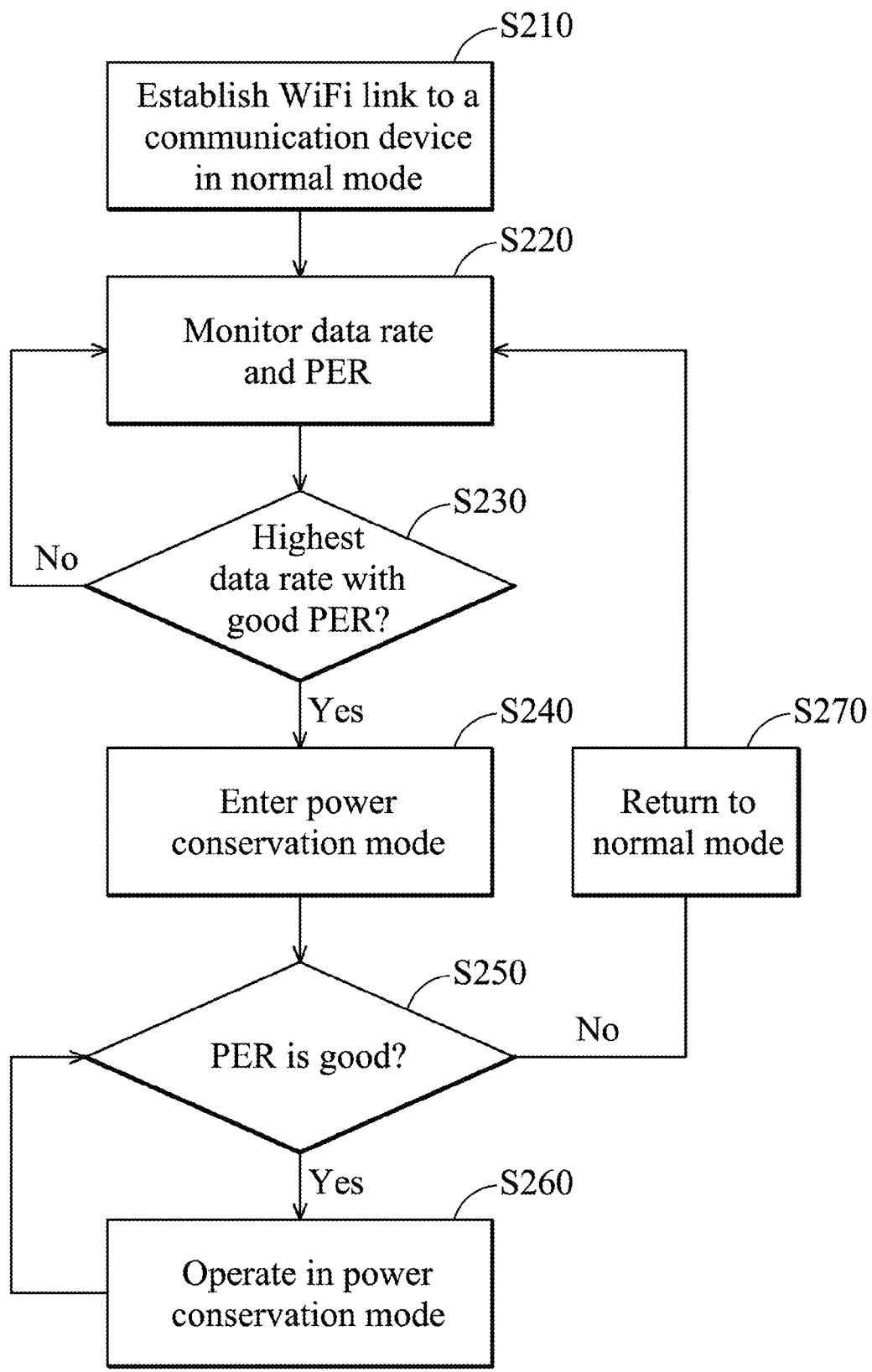
FIG. 3 shows a method for controlling transmission power of a wireless device with the WLAN module of FIG. 2 according to an embodiment of the invention.

FIG. 3 shows a method for controlling transmission power of a wireless device with the WLAN module 100 of FIG. 2 according to an embodiment of the invention. Referring to FIG. 2 and FIG. 3 together, first, the WLAN module 100 of the wireless device operates in a normal mode and establishes a WiFi link to a communication device (step S210). In step S220, the WLAN module 100 continues to monitor/detect a data rate of data packets transmitted to the communication device and obtains a PER corresponding to the ACK messages from the communication device in response to the transmitted data packets. In the WLAN module 100, the processor 160 obtains the data rate of data packets transmitted to the communication device according to the modulation operations of the TX/RX processing unit 150. Once it is detected that the PER is good (i.e. the PER does not exceed a threshold $PER_{th}$) and the data rate reaches a highest data rate that can be supported by the WLAN module 100 (step S230), such as 11 Mbps for the 802.11b specification, 54 Mbps for the 802.11g specification or MCS7 for the 802.11n specification, the WLAN module 100 enters a power conservation mode (step S240), and then the processor 160 provides the control signal Ctrl to the PA 140, to decrease transmission power. Next, the WLAN module 100 checks whether the PER is still good (i.e. the PER does not exceed the threshold $PER_{th}$) (step S250). If no (i.e. the PER exceeds the threshold $PER_{th}$), the WLAN module 100 returns back to the normal mode, and the processor 160 provides the control signal Ctrl to the PA 140, to recover the transmission power (i.e. increase transmission power) (step S270), and then step S220 is performed to continue monitoring the data rate and the PER. On the contrary, if the PER is good (i.e. the PER does not exceed the threshold $PER_{th}$), the WLAN module 100 continues to operate in the power conservation mode, so as to transmit the data packets with lower transmission power to the communication device (step S260). Thus, power consumption of the WLAN module 100 is decreased. In addition, the WLAN module 100 periodically checks the PER in the power conservation mode (step S250), so as to determine whether to return to the normal mode. In the power conservation mode, the wireless device of the invention may decrease the current transmission power according a predefined scale, such as 1 dB, 3 dB (i.e. a half of the current transmission power) and so on, so as to obtain an optimal transmission power without affecting the PER. Furthermore, the wireless device performs the method of FIG. 3 without additional circuits and complex operations due to the data rate and the PER being given. In other words, it is easy to implement the method for controlling transmission power of a wireless device according to the embodiment. In the embodiment, the threshold $PER_{th}$ is determined according to actual applications.

TABLE 1 shows an example illustrating the relationships between the data rate, transmission power and power consumption of various WiFi modes according to the method of FIG. 3. Taking the 802.11b specification as an example, when a wireless device uses a highest data rate 11 Mbps to transmit data packets to a communication device in a normal mode and obtains a good PER in response to the transmitted data packets, the wireless device will enter a power conservation mode, to decrease the transmission power from 18 dBm to 13 dBm. Thus, power consumption of the wireless device is decreased from 260 mA to 170 mA.

TABLE 1

| Mode | Data rate | Transmission Power (dBm) | power consumption (mA) |
|---|---|---|---|
| 802.11b | 1 Mbps (Normal mode) | 18 | 260 |
| | 2 Mbps (Normal mode) | 18 | 260 |
| | 5.5 Mbps (Normal mode) | 18 | 260 |
| | 11 Mbps (Normal mode) | 18 | 260 |
| | 11 Mbps (power conservation mode) | 13 | 170 |
| 802.11g | 6 Mbps (Normal mode) | 13 | 170 |
| | 9 Mbps (Normal mode) | 13 | 170 |
| | 12 Mbps (Normal mode) | 13 | 170 |
| | 18 Mbps (Normal mode) | 13 | 170 |
| | 24 Mbps (Normal mode) | 13 | 170 |
| | 36 Mbps (Normal mode) | 13 | 160 |
| | 48 Mbps (Normal mode) | 13 | 140 |
| | 54 Mbps (Normal mode) | 13 | 140 |
| | 54 Mbps (power conservation mode) | 10 | 100 |
| 802.11n | MCS0 (Normal mode) | 13 | 170 |
| | MCS1 (Normal mode) | 13 | 170 |
| | MCS2 (Normal mode) | 13 | 170 |
| | MCS4 (Normal mode) | 13 | 170 |
| | MCS5 (Normal mode) | 13 | 160 |
| | MCS6 (Normal mode) | 13 | 140 |

TABLE 1-continued

| Mode | Data rate | Transmission Power (dBm) | power consumption (mA) |
|---|---|---|---|
| | MCS7 (Normal mode) | 13 | 140 |
| | MCS7 (power conservation mode) | 10 | 100 |

Figure 4:
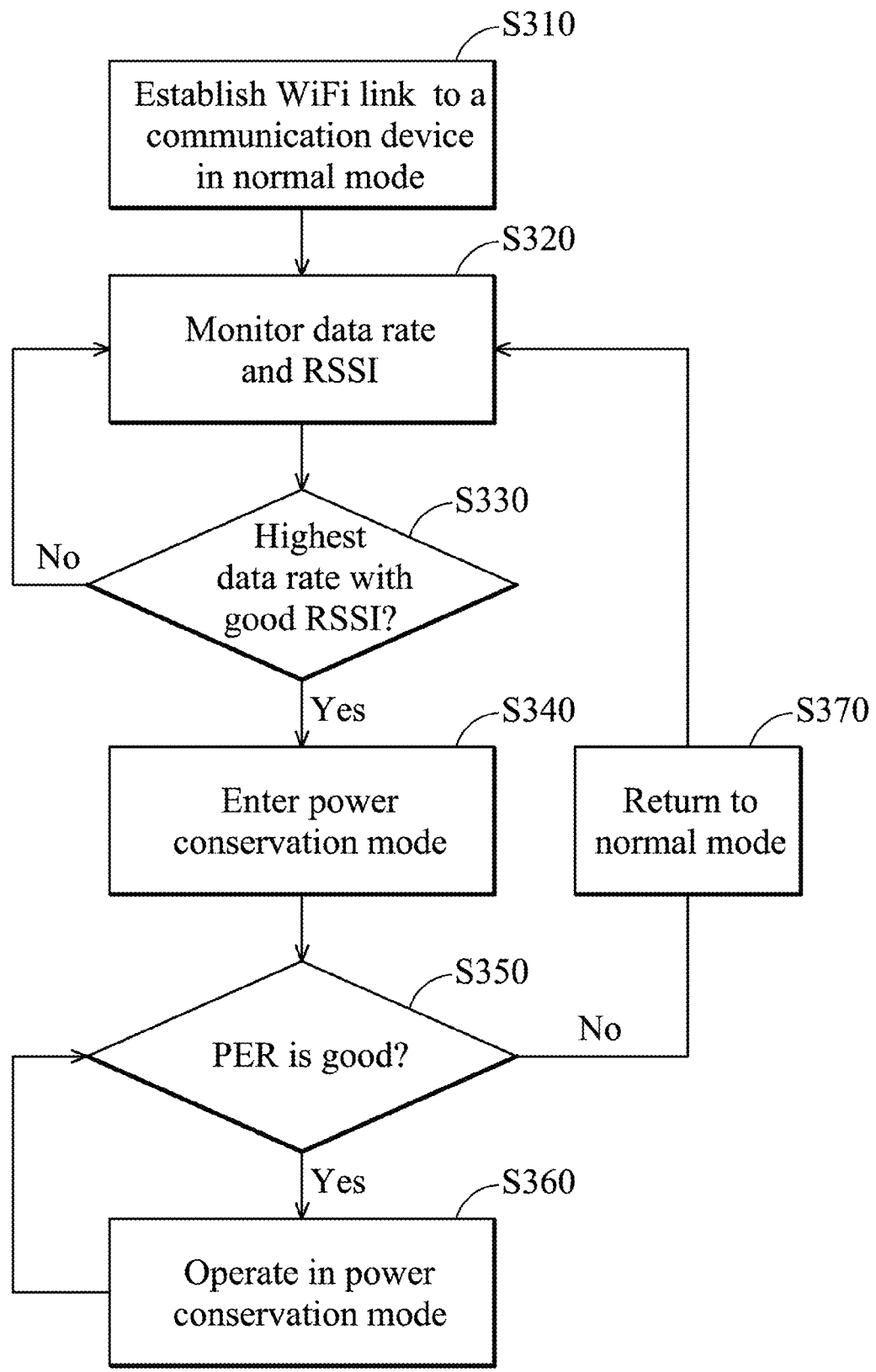
FIG. 4 shows a method for controlling transmission power of a wireless device with the WLAN module of FIG. 2 according to another embodiment of the invention.

Referring back to FIG. 2, the RF module 120 may further use a measure circuit to obtain a received signal strength indicator (RSSI) according to the RF signal $RF_{in}$ that comprises the ACK messages from the communication device in response to the data packets transmitted by the wireless device, and provide the RSSI to the processor 160 of the Baseband chip 110. The measure circuit may be an independent circuit or may be integrated into the LNA 130 or the TX/RX processing unit 150. FIG. 4 shows a method for controlling transmission power of a wireless device with the WLAN module 100 of FIG. 2 according to another embodiment of the invention. Referring to FIG. 2 and FIG. 4 together, first, the WLAN module 100 of the wireless device operates in a normal mode and establishes a WiFi link to a communication device (step S310). In step S320, the WLAN module 100 continues to monitor/detect a data rate of data packets transmitted to the communication device and obtains an RSSI corresponding to the ACK messages from the communication device in response to the transmitted data packets. Once it is detected that the RSSI is good (i.e. the RSSI exceeds a threshold $RSSI_{th}$) and the data rate reaches a highest data rate that can be supported by the WLAN module 100 (step S330), such as 11 Mbps for the 802.11b specification, 54 Mbps for the 802.11g specification or MCS7 for the 802.11n specification, the WLAN module 100 enters a power conservation mode (step S340), and then the processor 160 provides the control signal Ctrl to the PA 140, to decrease transmission power. Next, the WLAN module 100 checks whether the PER is good (step S350). If no (i.e. the PER exceeds the threshold $PER_{th}$), the WLAN module 100 returns back to the normal mode, and the processor 160 provides the control signal Ctrl to the PA 140, to recover the transmission power (i.e. increase transmission power) (step S370), and then step S320 is performed to continue monitoring the data rate and the RSSI. On the contrary, if the PER is good (i.e. the PER does not exceed the threshold $PER_{th}$, the WLAN module continues to operate in the power conservation mode, so as to transmit the data packets with lower transmission power to the communication device (step S360). Thus, power consumption of the WLAN module 100 is decreased. In addition, the WLAN module 100 periodically checks the PER in the power conservation mode (step S350), so as to determine whether to return to the normal mode. In the embodiment, the threshold $PER_{th}$ and $RSSI_{th}$ are determined according to actual applications.

Figure 5:
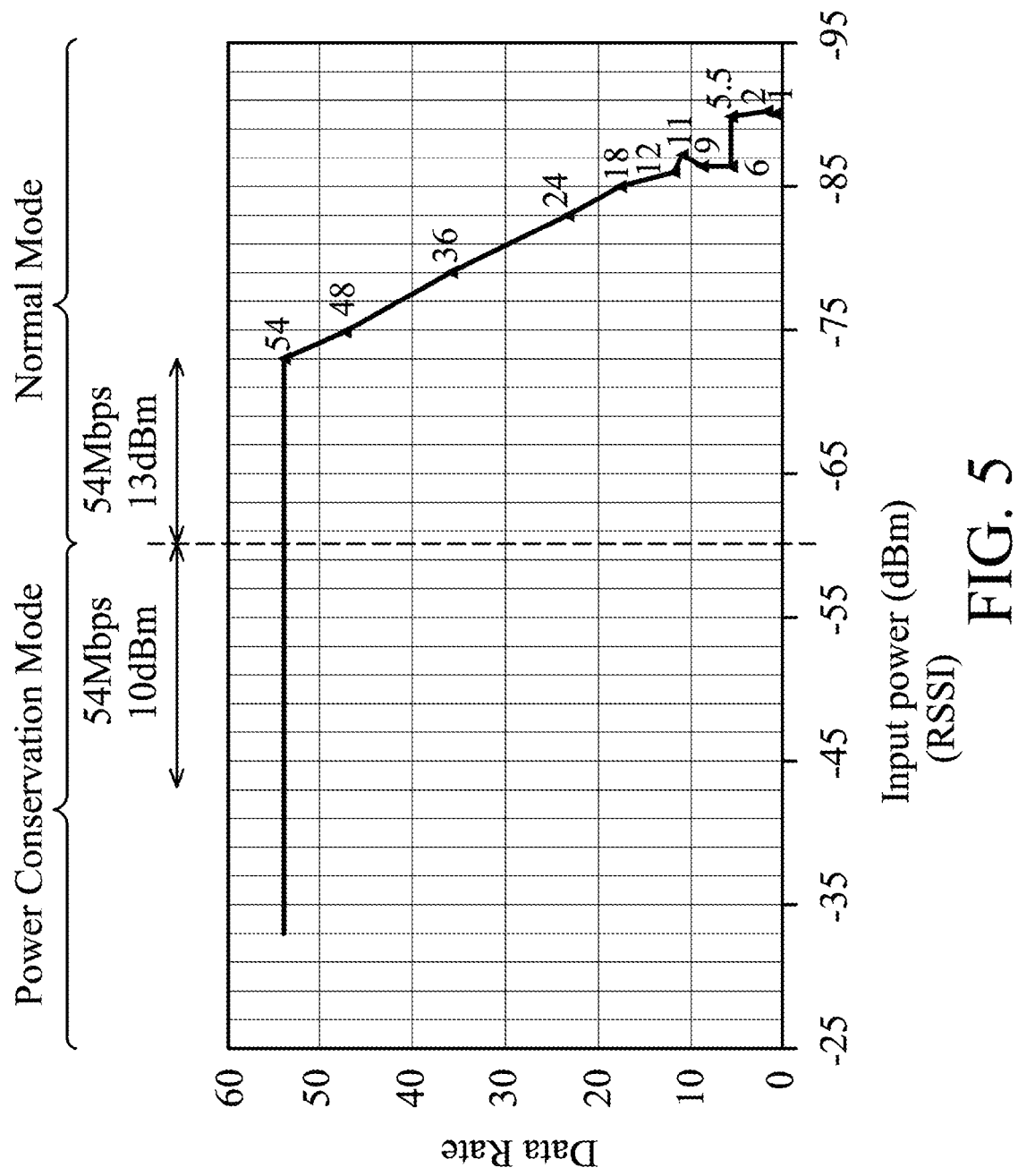
FIG. 5 shows an exemplary diagram illustrating the relationships between a data rate and input power (RSSI).

FIG. 5 shows an exemplary diagram illustrating the relationships between a data rate and input power (RSSI). In FIG. 5, the wireless device will switch to a power conservation mode from a normal mode when the data rate reaches a highest value such as 54 Mbps and the input power is sustained at a good quality such as a value larger than −60 dBm, thus the transmission power drops to 10 dBm from 13 dBm.

Figure 6:
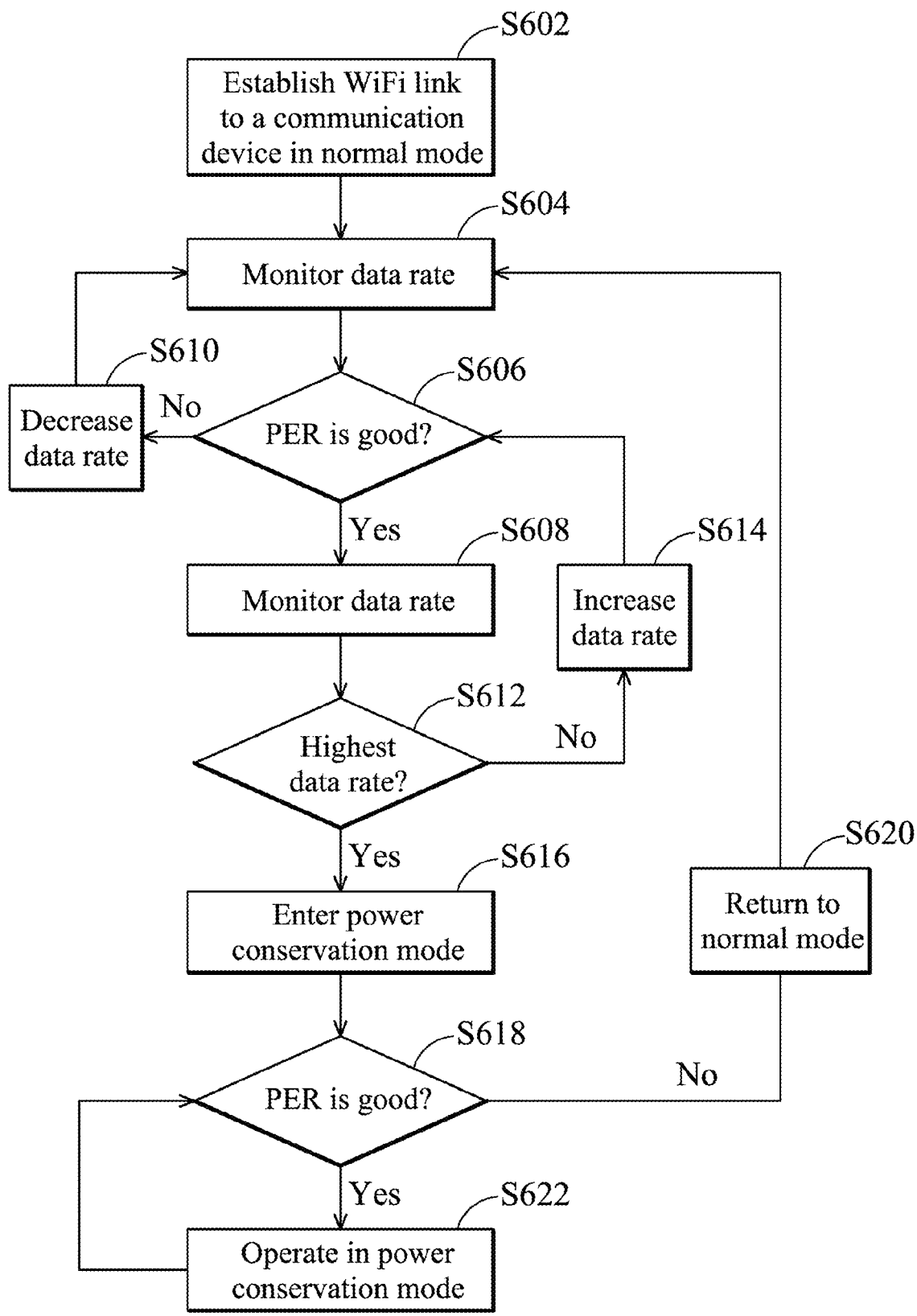
FIG. 6 shows a method for controlling transmission power of a wireless device with the WLAN module of FIG. 2 according to another embodiment of the invention.

FIG. 6 shows a method for controlling transmission power of a wireless device with the WLAN module 100 of FIG. 2 according to another embodiment of the invention. Referring to FIG. 2 and FIG. 6 together, first, the WLAN module 100 of the wireless device operates in a normal mode and establishes a WiFi link to a communication device (step S602). In step S604, the WLAN module 100 continues to monitor a data rate of data packets transmitted to the communication device and obtains a PER in response to the transmitted data packets. Next, it is determined whether the PER is good (step S606). If no (i.e. the PER exceeds the threshold $PER_{th}$), the WLAN module 100 decreases the data rate of data packets (step S610). Otherwise, if the PER has not exceeded the threshold $PER_{th}$, the WLAN module 100 continues to monitor the data rate (step S608), to detect whether the data rate has reached a highest data rate that can be supported by the WLAN module 100 (step S612), such as 11 Mbps for the 802.11b specification, 54 Mbps for the 802.11g specification or MCS7 for the 802.11n specification. If the data rate has not reached the highest data rate, the WLAN module 100 increases the data rate of data packets (step S614), and then step S606 is performed to continue monitoring the PER. Otherwise, the WLAN module 100 enters a power conservation mode (step S616), and then the processor 160 provides the control signal Ctrl to the PA 140, to decrease transmission power. Next, the WLAN module 100 checks whether the PER is still good (step S618). If no (i.e. the PER exceeds the threshold $PER_{th}$), the WLAN module 100 returns back to the normal mode, and the processor 160 provides the control signal Ctrl to the PA 140, to recover the transmission power (i.e. increase transmission power) (step S620), and then step S604 is performed to continue monitoring the data rate. On the contrary, if the PER is good (i.e. the PER does not exceed the threshold $PER_{th}$), the WLAN module 100 continues to operate in the power conservation mode, so as to transmit the data packets with the decreased transmission power (step S622). Thus, power consumption of the WLAN module 100 is decreased. In addition, the WLAN module 100 periodically checks the PER in the power conservation mode (step S618), so as to determine whether to return to the normal mode. In the embodiment, the threshold $PER_{th}$ is determined according to actual applications.

Figure 7A:
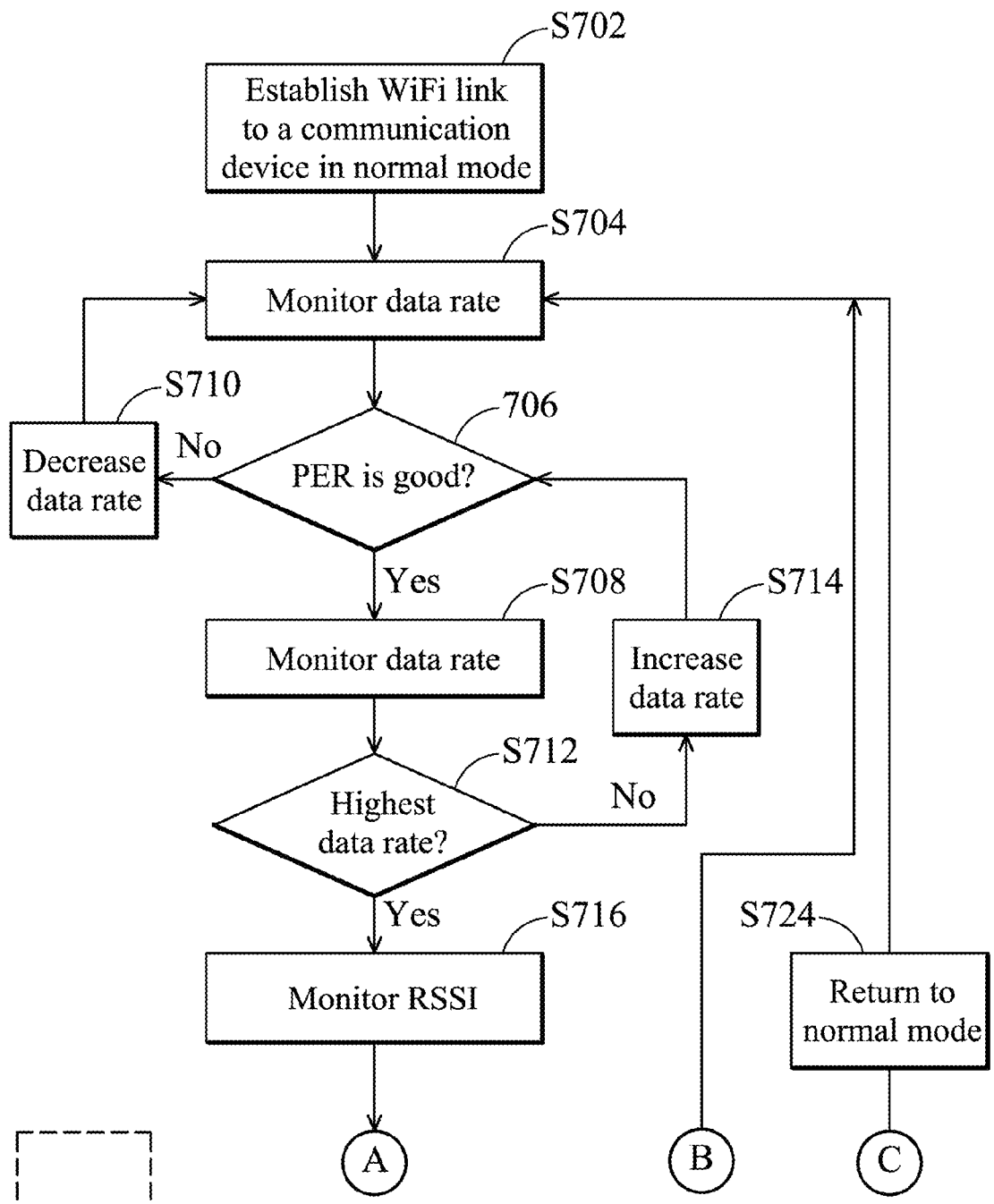
FIGS. 7A and 7B show a method for controlling transmission power of a wireless device with the WLAN module of FIG. 2 according to another embodiment of the invention.
Figure 7B:
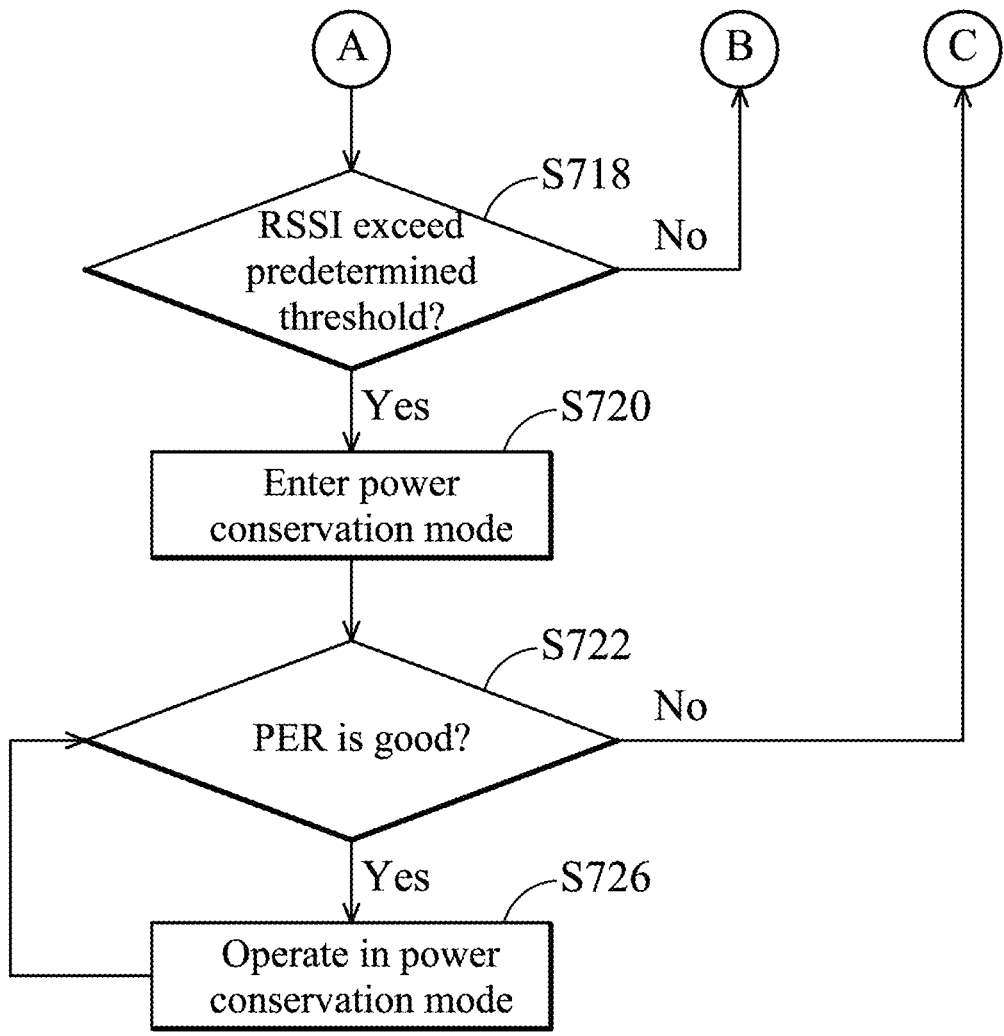

FIGS. 7A and 7B show a method for controlling transmission power of a wireless device with the WLAN module 100 of FIG. 2 according to another embodiment of the invention. Referring to FIG. 2 and FIGS. 7A and 7B together, first, the WLAN module 100 of the wireless device operates in a normal mode and establishes a WiFi link to a communication device (step S702). In step S704, the WLAN module 100 continues to monitor a data rate of data packets transmitted to the communication device and obtains a PER in response to the transmitted data packets. Next, it is determined whether the PER is good (step S706). If no (i.e. the PER exceeds a threshold $PER_{th}$), the WLAN module 100 decreases the data rate of data packets (step S710). Otherwise, if the PER has not exceeded the threshold $PER_{th}$, the WLAN module 100 continues to monitor the data rate (step S708), to detect whether the data rate has reached a highest data rate that can be supported by the WLAN module 100 (step S712), such as 11 Mbps for the 802.11b specification, 54 Mbps for the 802.11g specification or MCS7 for the 802.11n specification. If the data rate has not reached the highest data rate, the WLAN module 100 increases the data rate of data packets (step S714), and then step S706 is performed to continue monitoring the PER. Otherwise, the WLAN module 100 further monitors an RSSI (step S716). Next, it is determined whether the RSSI exceeds a predetermined threshold $RSSI_{th}$ (step S718). If the RSSI has not exceeded the predetermined threshold $RSSI_{th}$, step S704 is performed to continue monitoring the data rate. Otherwise, the WLAN module 100 enters a power conservation mode (step S720), and then the processor 160 provides the control signal Ctrl to the PA 140, to decrease transmission power. Next, the WLAN module 100 checks whether the PER is good (step S722). If no (i.e. the PER exceeds the threshold $PER_{th}$), the WLAN module 100 returns back to the normal mode and the processor 160 provides the control signal Ctrl to the PA 140 to recover the transmission power (step S724), and then step S704 is performed to continue monitoring the data rate. On the contrary, if the PER is good (i.e. the PER does not exceed the threshold $PER_{th}$), the WLAN module 100 continues to operate in the power conservation mode to transmit the data packets with the decreased transmission power (step S726), thus power consumption of the WLAN module 100 is decreased. In addition, the WLAN module 100 periodically checks the PER in the power conservation mode (step S722), so as to determine whether to switch back to the normal mode. In the embodiment, the threshold $PER_{th}$ and $RSSI_{th}$ are determined according to actual applications.

FIG. 8 shows a schematic diagram illustrating a mobile network communication system according to an embodiment of the invention. In FIG. 8, all electrical devices 10, 20, 30, 40 and 50 are equipped with WLAN modules (e.g. 802.11b, 802.11g or 802.11n specifications) to perform data communications, wherein the device 10 camps on a cellular station 60 of a service network. The wireless communications between the device 10 and the service network may be in compliance with various wireless technologies, such as the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA 2000) technology, Time Division-Synchronous Code Division Multiple Access (TD-SCDMA) technology, Worldwide Interoperability for Microwave Access (WiMAX) technology, Long Term Evolution (LTE) technology, LTE Advanced (LTE-A) technology, and others. In FIG. 8, the device 10 functions as a hotspot in WiFi technology, which offers Internet access for the devices 20, 30, 40 and 50, thus the devices 20, 30, 40 and 50 can access an Internet network through the device 10 and the cellular station 60 of the service network. In FIG. 8, the device 10 may use different or the same data rates to transmit packets to the devices 20, 30, 40 and 50. Therefore, when the device 10 transmits packets to at least one of the devices 20, 30, 40 and 50 with a highest data rate (e.g. 11 Mbps for the 802.11b specification, 54 Mbps for the 802.11g specification or MCS7 for the 802.11n specification) and obtains a good PER (or RSSI) corresponding to the highest data rate, the device 10 may determine whether to decrease transmission power according the data rates of the devices other than the one with the highest data rate and the corresponding PERs or RSSIs. Specifically, according to the data rates of the packets transmitted to various devices 20, 30, 40 and 50 and the corresponding PERs or RSSIs, the device 10 will appropriately control its transmission power according to the methods of the invention without affecting packet transmissions, so as to decrease power consumption of the wireless device 10.

Figure 9:
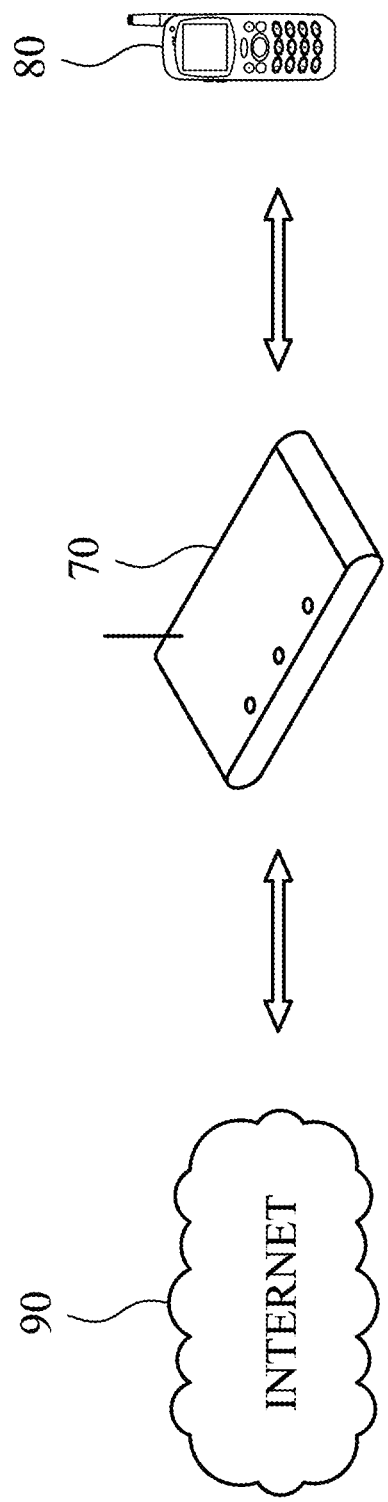
FIG. 9 shows a schematic diagram illustrating an internet network communication system according to an embodiment of the invention.

FIG. 9 shows a schematic diagram illustrating an internet network communication system according to an embodiment of the invention. In FIG. 9, the electrical device 80 transmits data packets to an Internet network 90 through a wireless access point (AP) device 70. As described above, when the electrical device 80 transmits data packets with a highest data rate (e.g. 11 Mbps for the 802.11b specification, 54 Mbps for the 802.11g specification or MCS7 for the 802.11n specification), the electrical device 80 may further determine whether to enter a power conservation mode according to the corresponding PER or RSSI. Specifically, if the electrical device 80 obtains a good PER (or RSSI) corresponding to the highest data rate, the wireless device 80 will appropriately control its transmission power without affecting packet transmissions, so as to decrease power consumption.

The embodiments of the innovation disclose the methods to control transmission power (i.e. output power) of a wireless device which uses IEEE 802.11 WiFi communication technologies to transmit data packets to other wireless devices. When the wireless device uses a highest data rate to transmit the data packets to the other wireless devices, the wireless device will enter a power conservation mode to decrease its transmission power without degrading communication quality. Therefore, power consumption is decreased for the wireless device; especially, for short-distances in a peer to peer mode or access mode.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for controlling transmission power of a wireless device, comprising:
   establishing a WiFi link to a communication device;
   transmitting data packets to the communication device according to a first transmission power;
   adjusting a data rate of the data packets according to a packet error rate (PER);
   transmitting data packets to the communication device according to a second transmission power smaller than the first transmission power when the data rate of the data packets reaches a highest data rate and the PER satisfies a specific condition; and
   transmitting data packets to the communication device according to the first transmission power when the data rate of the data packets reaches the highest data rate and the PER does not satisfy the specific condition;
   obtaining a received signal strength indicator (RSSI) corresponding to the communication device; and
   wherein the step of transmitting data packets to the communication device according to the second transmission power further comprises:
   transmitting data packets to the communication device according to the first transmission power when the data rate of the data packets reaches the highest data rate, the PER does not exceed a first predetermined threshold and the RSSI does not exceed a second predetermined threshold; and
   transmitting data packets to the communication device according to the second transmission power when the data rate of the data packets reaches the highest data rate, the PER does not exceed a first predetermined threshold and the RSSI exceeds the second predetermined threshold.

2. The method as claimed in claim 1, wherein the step of adjusting the data rate of the data packets according to the PER further comprises:

decreasing the data rate of the data packets when the PER exceeds a predetermined threshold; and increasing the data rate of the data packets when the PER does not exceed the predetermined threshold and the data rate does not reach the highest data rate.

\* \* \* \* \*